United States Patent [19]

Marshall et al.

[11] 4,431,625

[45] Feb. 14, 1984

[54] PRODUCTION OF CHROMIUM TRIOXIDE

[75] Inventors: Michael A. Marshall, Darlington, England; Danvers A. Swales, Corpus Christi, Tex.

[73] Assignee: British Chrome & Chemicals Limited, Stockton-on-Tees, England

[21] Appl. No.: 508,687

[22] Filed: Jun. 28, 1983

Related U.S. Application Data

[63] Continuation-in-part of Ser. No. 120,432, Feb. 11, 1980, Pat. No. 4,291,000.

[30] Foreign Application Priority Data

Aug. 2, 1980 [GB] United Kingdom ................. 8025312

[51] Int. Cl.$^3$ ............................................ C01G 37/033
[52] U.S. Cl. ..................................... 423/607; 423/53; 423/520; 423/551
[58] Field of Search ................. 423/53, 520, 551, 607

[56] References Cited

U.S. PATENT DOCUMENTS 2,034,256 3/1936 Vetter .................................. 423/607
2,632,688 3/1953 Perrin .................................. 423/607
3,002,815 10/1961 Heinze ................................. 423/607

FOREIGN PATENT DOCUMENTS 338938 12/1930 United Kingdom ................ 423/607
793973 4/1958 United Kingdom ................ 423/607

Primary Examiner—Herbert T. Carter
Attorney, Agent, or Firm—Lawrence Rosen

[57] ABSTRACT

Chromium trioxide is made by reacting sodium dichromate with sulphuric acid in an aqueous reaction mixture, evaporating the resultant liquor to cause crystallization of most of the chromium trioxide and to cause the concentration of sodium sulphates to be close to but below that at which sulphate crystals start to form, and separating the chromium trioxide crystals from the evaporated liquor. The liquor may then be cooled so as to cause crystallization of sodium sulphates, generally as sodium bisulphate, and the resultant liquor, after separation of the crystals, may be recycled to the reaction mixture containing dichromate and sulphuric acid.

24 Claims, No Drawings

PRODUCTION OF CHROMIUM TRIOXIDE

This application is a continuation-in-part of our application Ser. No. 120,432 filed Feb. 11, 1980, now U.S. Pat. No. 4,291,000, and of our application Ser. No. 287,391 filed July 27, 1981 now abandoned.

Chromium trioxide ($CrO_3$, sometimes known as chromic anhydride) may be made by reacting sodium dichromate with sulphuric acid in an aqueous medium to form a slurry of chromium trioxide crystals in a liquor containing dissolved chromium trioxide and dissolved sodium busulphate. The commonly accepted equation for this reaction is

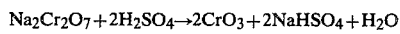

$$Na_2Cr_2O_7 + 2H_2SO_4 \rightarrow 2CrO_3 + 2NaHSO_4 + H_2O$$

A traditional way of isolating pure chromium trioxide from the slurry has involved fusion of the crude crystalline fraction of the reaction mixture. The behaviour of the crude crystals during fusion is dictated partly by the ratio of acid to dichromate. For instance if the ratio is too high then the excess acid causes the melting mixture to froth and to boil over creating a hazard for the process operators. On the other hand if the ratio is too low then the separation of the molten chromium trioxide is impaired and the product is contaminated with sodium bisulphate. For these reasons the ratio of sulphuric acid to sodium dichromate is generally controlled to within the range 2.1–2.3 moles to 1.

In British Patent Specification No. 2,041,347 (published after the priority date of this application) we describe a different method of isolating pure chromium trioxide from the slurry, this method involving washing the separated crude chromium trioxide crystals with an aqueous purifying wash liquor while the crystals and the liquor are at a temperature above 50° C. and centrifuging the washed product. The wash liquor may be water but it is generally a chromic acid solution. For instance the slurry obtained by the reaction may be centrifuged and washed while continuing the centrifuging. Again, at least 2.0 moles sulphuric acid per mole of sodium dichromate must be used but in order to maximise the yield of chromium trioxide, and at the same time to limit the amount of acidic waste liquors (per unit of $CrO_3$ produced) which have to be disposed of, the amount of sulphuric acid required is generally 2.4–2.8 moles per mole of dichromate.

This process results in the production of large volumes of waste liquors that are acidic, are contaminated by chromium compounds, and that contain large amounts of sodium bisulphate.

Other processes that are known for isolating pure chromium trioxide from the described reaction mixture often also produce, to a greater or lesser extent, similar waste liquors.

In processes where large volumes of such waste liquors are produced, for instance as in specification No. 2,041,347, their disposal can create a serious problem. They cannot be discharged as effluent and they cannot merely be recycled for reaction with sodium dichromate because an additional stage would then be required to remove sodium and sulphate values to prevent their accumulation.

In addition such recycling could not be tolerated unless some other stage is added to the process to remove sodium and sulphate values to prevent their accumulation.

At present therefore such processes can only be operated economically by large chromium chemical manufacturers who are equipped to deal with sulphate containing liquors.

Such manufacturers generally form sodium chromate by reaction of sodium carbonate with chromite ore and then acidify sodium chromate to form sodium dichromate. If the manufacturer is one who uses sulphuric acid for the acidification then the acidic sulphate containing liquors can be recycled usefully to this stage.

However some manufacturers acidify their sodium chromate to dichromate using carbon dioxide and their liquors remain sulphate-free. Such manufacturers would not readily be able to operate the process described in British Pat. No. 2,041,347 since they could not absorb the waste acidic liquors into their main dichromate process and it would not be economic to throw them away because of the treatment costs required to make them environmentally acceptable.

It is of course standard practice in many industrial processes to aid disposal of aqueous liquors by concentrating them by evaporation before disposal. Liquors resulting from the separation of chromium trioxide from the reaction product of sodium dichromate and sulphuric acid contain both chromium values and large amounts of sodium bisulphate. Since the solubility in water of sodium bisulphate is generally accepted as being less than that of chromium trioxide concentration of such liquors would therefore have been expected to result in crystallisation of some sodium bisulphate, but the final liquors would still contain the chromium values and it would be wasteful and difficult to dispose of these.

In U.S. Pat. No. 2,034,256 Vetter describes a process in which he alleges that when sodium dichromate and sulphuric acid are combined and the product is cooled, sodium sulphate ($Na_2SO_4$) crystallises to leave a liquor containing chromium trioxide and sodium sulphate and he proposes that this liquor can be evaporated to form solid chromium trioxide and a solution containing further chromium trioxide and sodium sulphate $Na_2SO_4$. He proposes that this solution should be recycled to the reaction mixture. The sodium sulphate crystals, which he crystallises in the first stage after his reaction, will inevitably be contaminated with mother liquor containing much dissolved chromium trioxide because they are crystallised from a solution containing all the chromium trioxide formed in the reaction. They will therefore be difficult to purify except by using large amounts of wash liquor. The chromium trioxide crystals that are formed upon evaporation will inevitably be contaminated by sodium sulphate dissolved in the entrained mother liquor and we have found that simple washing of the crystals, in the manner proposed in U.S Pat. No. 2,034,256, does not result in adequate purity. In particular attempts to increase the purity by prolonged washing results in severe loss of chromium trioxide.

Vetters reaction conditions apparently involve crystallising sodium sulphate as $Na_2SO_4$. Careful analysis by us of a process conducted in accordance with Vetters exemplified reaction conditions has shown that the sodium sulphate which crystallises out is not $Na_2SO_4$ by is instead the double salt $NaHSO_4Na_2SO_4$, and the mother liquor contains unreacted sodium dichromate. Since the mother liquor is recycled for admixture with equimolar amounts of sodium dichromate and sulphuric acid there will be a tendency for sodium dichromate to build up in the system and eventually to contaminate the chromium trioxide crystals.

Our objective is to obtain high yields of chromium trioxide while making it possible to minimise or totally eliminate disposal problems of by-products, and for the reasons given above the process described in U.S. Pat. No. 2,034,256 does not appear to be a commercially useful process for achieving these objects.

Study by us of the detailed description of the process in U.S. Pat. No. 2,034,256 has confirmed that the process is indeed difficult, and perhaps impossible, to achieve in commercial practice.

Vetter may have been influenced, in proposing his process, by the generally accepted knowledge of the solubilities of the materials in his reaction liquors. However we have now made some surprising, and hitherto unpublished, discoveries relating to the materials that are present in the reaction liquors, variations that occur due to changes in the amount of acid, and in particular the solubilities of the various materials under various conditions. Based on these discoveries we have sought to raise the yield of chromium trioxide beyond that normally achieved by conventional processes and to reduce the amount of acidic waste liquors, for instance to amounts significantly below the amounts produced in the examples in the process we described in our previously unpublished British Patent Specification No. 2,041,347.

In the invention chromium trioxide is made by forming a reaction mixture of sodium dichromate and sulphuric acid in an aqueous medium and thereby forming a liquor containing dissolved chromium trioxide and dissolved sodium sulphate, evaporating the liquor to cause crystallisation of most of the chromium trioxide as crystals substantially free of a sodium sulphate and to cause the concentration of sodium sulphate to be close to but below that at which crystals of sodium sulphate start to form, and separating the chromium trioxide crystals from the evaporated liquor.

Since part of the success of the process depends upon the particular sodium sulphate that is present and upon the solubility thereof it must be understood that, throughout this specification and claims, the term "sodium sulphate" without additional explanation is intended to be generic to, for instance, anhydrous and hydrated $Na_2SO_4$, anhydrous and hydrated $NaHSO_4$, and double salts of $Na_2SO_4$ and $NaHSO_4$. In those instances in the specification and claims where it is intended to refer to a particular form of sodium sulphate or bisulphate, as opposed to the generic class, this is made clear.

As explained in more detail below the process can be conducted without recycle but a commercially very useful process according to the invention includes a recycle. Briefly, the evaporated liquor may be cooled after separation of the chromium trioxide crystals so as to form crystals of sodium sulphate, these crystals may then be removed from the cooled liquor and the resulting liquor may then be recycled to the reaction mixture and mixed with fresh sodium dichromate and sulphuric acid.

It might have been thought that the reaction between sodium dichromate and sulphuric acid could be an equimolar one, proceeding according to the equation $$Na_2Cr_2O_7 + H_2SO_4 \rightarrow 2CrO_3 + Na_2SO_4 + H_2O.$$

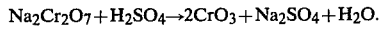

Indeed equimolar quantities are used in U.S. Pat. No. 2,034,256. As mentioned our analysis of such a reaction has shown that the sodium sulphate crystallises out as the double salt $NaHSO_4 \cdot Na_2SO_4$ and some unreacted sodium dichromate remains in solution. If all sodium dichromate is to be reacted then it seems that the reaction is best represented by the equation $$Na_2Cr_2O_7 + 4/3 H_2SO_4 \rightarrow 2CrO_3 + \tfrac{2}{3} NaHSO_4 \cdot Na_2SO_4 + H_2O.$$

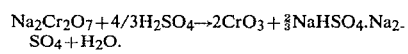

Any sulphuric acid in excess of 4/3 moles per mole of dichromate will react with the double salt to convert it into the acid sulphate $NaHSO_4$ $$NaHSO_4 \cdot Na_2SO_4 + H_2SO_4 \rightarrow 3 NaHSO_4.$$

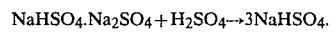

We have now concluded that in fact the molar ratio of sodium dichromate:sulphuric acid in the initial reaction mixture is very important to commercial success of the process and in particular that the 1:1 ratio is not satisfactory. Thus the ratio must be at least 1:1.33 and preferably is above 1:1.9. The theoretical optimum is 1:2.0 but it is generally desirable to have a slight excess so as to minimise or prevent the formation of the double salt and so the ratio is usually above 1:2.05. Also use of ratios above 1:2.0 does tend to raise the yield of crystalline chromium trioxide because the excess acid reduces the solubility of the trioxide in the liquors but when, as is described below, the process is operating with a recycle any excess acid over 2.0 moles will if uncorrected result in a gradual increase in acid content over successive cycles and may interfere with the subsequent crystallisation of chromium trioxide and sodium sulphate. Although the ratio can be as high as, for example, 1:2.8 generally there is no advantage in using a ratio above 1:2.4 and generally it is preferred that the ratio should be not more than 1:2.2 or 1:2.3.

The sulphuric acid is generally introduced as conventional concentrated sulphuric acid, for instance having a concentration of at least 95% by weight.

The sodium dichromate may be introduced as a liquor of any concentration but preferably the liquor contains 80 to 92%, most preferably about 90%, dichromate expressed as the dihydrate.

Conditions, and in particular the concentration of sodium dichromate, are normally such that the liquor formed by the reaction contains chromium trioxide crystals as well as dissolved chromium trioxide. If the concentration of the sodium dichromate that is introduced is less than 90% then the amount of chromium trioxide crystals that precipitates out from the reaction mixture before the evaporation is smaller than it would otherwise have been and the amount which precipitates during evaporation is higher. If the ratio of chromium trioxide crystals to mother liquor is too great during the evaporation stage the evaporation may have to be interrupted to take out an intermediate crop of crystals.

Below about 66% sodium dichromate dihydrate concentration no yield of chromium trioxide crystals is obtained except by either addition of large excesses of sulphuric acid, e.g. 2.2 moles or more per mole sodium dichromate, or by evaporation of the acidified mixture. In this latter case it is possible that evaporation would have to be carried out in two stages with a filtration step between the two stages since evaporation in a single stage may give rise to such a concentrated slurry as to cause handling difficulties.

Thus if the sodium dichromate solution that is combined with the sulphuric acid has too low a concentration the resultant liquor will not initially contain chromium trioxide cyrstals unless a large excess of sulphuric acid is used. Even if the liquor initially does not contain chromium trioxide crystals these crystals will be brought down by the evaporation. To facilitate handling of the slurry it is necessary that the amount of crystals should not be too high (for instance generally it should not exceed 30% by weight of the slurry) and so it may be desirable to conduct the evaporation in two stages and to separate crystals formed in the first stage before conducting the second stage of evaporation.

If the concentration of the sodium dichromate liquor introduced into the reaction is greater than 90%, or at the most 92%, care must be taken to prevent the sodium dichromate crystallising in the reaction mixture and also to prevent local overheating and thus decomposition of the product. If sodium dichromate does crystallise in the mixture then the crystals become coated with chromium trioxide which then slows down further reaction between sodium dichromate and sulphuric acid. This problem is even more acute if sodium dichromate dihydrate crystals are used instead of aqueous sodium dichromate in order to form the reaction mixture, i.e. without the addition of any additional water, even though eventual full reaction will occur.

Crystals that are formed in the reaction mixture may be separated from the liquor before the evaporation, and this is generally preferred when the liquor resulting from the process is not recycled. Typically the proportion of chromium trioxide which will precipitate in the reaction mixture when using concentrated aqueous sodium dichromate feedstock is from 60 to 80%, with the remainder remaining in solution. For instance when the reaction is conducted using a 90% sodium dichromate concentration and 2.0 moles of concentrated sulphuric acid it will be found that about 75% by weight of the chromium is precipitated when the liquor is not recycled but may be lower, for instance about 70%, when it is recycled.

Filtration may be by, for instance vacuum filtration but is preferably conducted by centrifuging. Preferably the centrifuging is conducted until the water content of the crystals is from 2 to 5% under conditions such that the crystals are maintained at a temperature above 50° C., the separated crystals are washed with a wash liquor above 50° C. and further centrifuged until the water content is less than 3% and the sulphate content, expressed as sodium bisulphate, is less than 3%, preferably all as described in specification No. 2,041,347.

The filtrate, and generally also the washings, or the entire liquor if there has been no prior separation of crystals are then subjected to evaporation and it is necessary to ensure that the amount of chromium trioxide that crystallises during the evaporation is not so great as to make it difficult or impossible to handle the slurry. Recycling of liquors from the end of the process back to the reaction mixture dilutes this and so facilitates handling, but alternatively crystals formed in the initial reaction mixture may be removed or the evaporation may be conducted in two stages with removal of crystals in between the stages, all as mentioned above. Generally it is desirable to ensure that the suspended solids in the slurry at all times remains below about 25% by weight, preferably around 20% by weight.

The temperature of the liquor during evaporation should be at least 90° C. and preferably at least 100° C. but usually will not be above 160° C. and preferably will be below 140° C. The preferred temperature is 110° to 122° C. Evaporation should be accompanied by boiling and so is preferably conducted under reduced pressure, for instance an absolute pressure of 26 to 46 cm mercury or below (i.e. a vacuum of 50 to 30 cm mercury) and often an absolute pressure of 26 to 39 cm mercury.

The mixture should be agitated during evaporation to aid release of water vapour. The chromium trioxide crystals cause a stable foam to build up on the surface of the boiling slurry and agitation helps to prevent the foam becoming excessive and possibly overflowing into the distillate section. The foam can also be minimised by allowing a slow stream of air to be drawn into the evaporator and allowing it to impinge on the foam itself.

The evaporator may be of conventional construction and may be, for instance, a vessel equipped with steam heated coils.

Evaporation is taken to a point just short of that at which sodium bisulphate starts to crystallise out and is generally equivalent to removing the majority of the water in the initial sodium dichromate feed solution (for instance in the non-recycle process 60% of the water introduced with 90% sodium dichromate solution is removed). The temperature and extent of evaporation must be such that the only solid phase which crystallises out during evaporation and during the subsequent separation of crystals is chromium trioxide.

The evaporated slurry containing crystals of chromium trioxide and containing dissolved sodium sulphate is then filtered to separate the chromium trioxide while being maintained at a temperature sufficiently high to prevent crystallisation of sodium sulphate from the slurry. Generally it is necessary for the temperature to be at least 85° C. and often above 95° C. When evaporation is at a temperature above 110° C. it is generally preferred that the slurry should be maintained at a temperature of above 110° C. during the separation.

The separation of the crystals from the evaporated slurry may be conducted by vacuum filtration or other filtration technique but preferably is by centrifuging and preferably the crystals are washed on the centrifuge using a wash liquor, preferably of water or an aqueous solution chromium trioxide, having a temperature sufficiently high to prevent precipitation as described above. The same centrifuge may be used to filter off the second crop of crystals as is used for the first since the centrifuge is preferably operated batchwise and the purification of both crops of crystals is similar. Any wash liquor used in this stage are preferably recycled to the evaporation stage. The preferred wash liquor is strong aqueous solution of chromium trioxide.

Most at least of the chromium trioxide that was in solution in the reaction mixture is separated from the slurry at this stage and the total amount of chromium trioxide crystals removed in this stage, together with any preceding removal stage, is generally at least 70 and preferably at least 80 or 90% of the total amount of chromium in the reaction mixture. Indeed when the process is operated with recycle it is easily possible to obtain substantially 100% recovery of chromium trioxide based on the sodium dichromate fed to the reaction mixture.

The mother liquors separated from the slurry will contain a small amount of chromium as chromium trioxide together with large amounts of sodium sulphate, primarily as sodium bisulphate. This liquor may be used in some other industrial process for which it is suitable or may be disposed of, but preferably sulphate recovered from it either so as to make the liquor more suitable for disposal or, especially, to make it more suitable for recycling.

In order to remove sulphate from the liquor it is cooled after separation of the chromium trioxide crystals with the result that crystals of sodium sulphate, and in particular sodium bisulphate, are formed and these crystals may then be separated from the cooled liquor. Generally the extent of evaporation is such that crystallisation of the sodium bisulphate does not start until the temperature is at least 20° C. and often 30° to 50° C. below the evaporation temperature and preferably the evaporation is such that crystallisation starts at temperatures below 110° C. and preferably at between 80° and 100° C. Preferably the liquor is cooled to a temperature not less than substantially 60° C., for instance 55° C. is generally the desired minimum.

It might be thought that upon cooling the first crystals to form would be of the double salt $NaHSO_4.Na_2SO_4$, and this is confirmed by the phase diagram for sulphuric acid, water and sodium sulphate illustrated in Comptes Rendus 1917 164 628–630. Since the formation of such crystals would lead to formation of free sulphuric acid this would encourage the formation of first of all the monohydrate of sodium bisulphate and ultimately of the anhydrous bisulphate. We have found, however, that these predictions are not fulfilled in practice.

The mother liquor separated from the evaporated slurry is saturated with respect to chromium trioxide and so, as the temperature falls, some chromium trioxide crystals form before crystallisation of sodium bisulphate starts. This first sodium sulphate crystals to form are the anhydrous form of sodium bisulphate and if the molar ratio acid:dichromate in the initial reaction mixture is at least 2.0 these continue to crystallise until the temperature falls to about 55° C. As the sodium bisulphate concentration in the mother liquor falls the solubility of chromium trioxide increases and the crystals of trioxide which had formed earlier now dissolve. Below 55° C. the crystals which form are the monohydrate form of sodium bisulphate but since the system is very concentrated, or in other words contains very little water, the abstraction of water as water of crystallisation leads to a rapid thickening and eventual setting of the liquor. This is very undesirable and so the minimum temperature for the cooling crystallisation stage is 55° C. most preferably 60° C.

When the molar ratio of sulphuric acid per mole of dichromate in the initial reaction mixture is less than 2.0 the eventual cooling crystallisation stage is modified. As before the initial crystals which form are anhydrous sodium bisulphate but as the temperature falls these are followed by crystals of the double salt which in turn are followed by monohydrate of sodium bisulphate.

The temperature at which the double salt $NaHSO_4.Na_2SO_4$ starts to crystallise from the liquor is dependent upon the initial ratio of sulphuric acid to sodium dichromate. For instance when the ratio is 2.0 mole or more of acid to one of dichromate, no double salt forms. When the ratio falls to 1.8 moles of acid per mole of dichromate crystals of the double salt start to form when the temperature falls below 75° C. When the ratio falls to 1.4 moles of acid per mole of dichromate crystals of the double salt begin to form before the temperature has fallen to 85° C. The presence of the double salt in the crop of sodium sulphate crystals is undesirable since it generally results in the crop containing some crystals of chromium trioxide.

The temperature of formation of the sodium bisulphate monohydrate is approximately 55° C. irrespective of the ratio of sodium dichromate to sulphuric acid used in the initial reaction although supercooling can be severe and it may not then crystallise until well below 55° C., for instance as low as 35° C.

The boiling point during the evaporation is preferably not above 122° C. (and evaporation is preferably at 110° to 122° C., especially 118° to 122° C.) since for boiling points above 122° C. the amount of chromium trioxide which crystallises out during the initial stages of the cooling process for the crystallisation of sodium bisulphate is more than will redissolve during the course of that crystallisation and thus the bisulphate crystals are contaminated with solid chromium trioxide. To ensure that the by-product sodium bisulphate crystallises in the anhydrous state and in an amount which leads to a slurry which can be handled and filtered the temperature of onset of bisulphate crystallisation is preferably 90° C. It is recommended that the evaporation temperature should be at least 20° C. higher than this to allow for the cooling which will inevitably occur during filtration to remove chromium trioxide. Co-crystallisation of sodium bisulphate with the chromium trioxide should be avoided since chromium trioxide is then the most soluble component and washing will remove product rather than contaminant.

The sodium bisulphate crystals are filtered off preferably by centrifuging. They may be washed with a small amount of water. The washings may be returned to the evaporator and the crystals of sodium bisulphate are disposed of. The crystals may be used as a cheap acidifying agent in any suitable process or alternatively may be discarded after appropriate treatment.

Although the liquors resulting from the separation of the sodium sulphate crystals can be disposed of some and preferably all of them are preferably recycled to the reaction mixture of sodium dichromate and sulphuric acid. Thus with this cyclic process it is possible to obtain high yields of chromium trioxide in which the only waste product is crystalline sodium bisulphate or other sodium sulphate.

A preferred cyclic process according to the invention comprises forming a reaction mixture of one mole sodium dichromate and at least 1.33, generally 2 to 2.8 and preferably 2.05 to 2.4, moles sulphuric acid to form a slurry of chromium trioxide crystals in a liquor containing dissolved chromium trioxide and dissolved sodium sulphate, evaporating the liquor under reduced pressure at a temperature of 100° to 160° C. to cause crystallisation of most of the chromium trioxide substantially free of sodium sulphate and to cause the concentration of sodium sulphate to be close to but below that at which crystals of sodium sulphate start to form, separating the chromium trioxide crystals, cooling the resultant liquor to a temperature of at least 55° C. but below 90° C. to crystallise sodium sulphate mainly or wholly as anhydrous sodium bisulphate, separating the crystals, reforming the reaction mixture by combining some or all of the resultant liquor with sodium dichromate and sufficient sulphuric acid to provide the said ratio, and repeating the process. The preferred temperatures, concentrations and other conditions are as described above and it is generally unnecessary to separate the first crop of chromium trioxide crystals from the liquor before evaporation. Generally the chromium trioxide crystals that are formed and separated are substantially equivalent to the amount of sodium dichromate added to the reaction mixture.

If the amount of acid present in the reaction mix in any stage is below 2.0 moles then the sodium bisulphate crystals are contaminated with the double salt. Although the solubility of chromium trioxide increases as the concentration of sodium bisulphate falls as a result of crystallisation, the amount of precipitated chromium trioxide is more than can be dissolved and the surplus contaminates the crop of mixed sodium bisulphate double salt crystals. For instance when 1.8 moles of sulphuric acid are used to acidify one mole of sodium dichromate solution the crystals which form under the preferred conditions during the cooling crystallisation of the mother liquor from the evaporation stage are contaminated with about 5% of chromium trioxide crystals. The contamination rises to over 14% of chromium trioxide crystals when the initial ratio of reactants is reduced still further to 1.4 moles of acid per mole of dichromate. Solid chromium trioxide is more difficult to remove from the by-product crystals by washing than chromium trioxide dissolved in the mother liquor and so much more wash water is used to remove it or it must be disposed of with the by-product crystals. The loss of chromium values associated with disposal and the large volume of washings are both undesirable.

Although in theory this can be avoided by operating each cycle at a dichromate:acid ratio of exactly 1:2.0 it is preferred to have an excess of sulphuric acid so as to ensure that the double salt is not formed. Typically therefore in the first cycle the ratio of dichromate to acid may be up to 1:2.8, generally below 1:2.4 and preferably around 1:2.2. In all subsequent cycles however the amount of sulphuric acid introduced at each cycle is preferably such that the acid:dichromate ratio in the mixture of new reactants and recycled liquor is maintained within the range 2.0 to 2.8, most preferably about 2.2. The ratio in the mixture of new reactants is preferably 2.0 since if it is consistently above 2.0 there will be a gradual build up of unwanted sulphuric acid in the system. Naturally fluctuations in the amount of sulphuric acid feed to the reaction mixture for each cycle may be unimportant provided the average feed is 2.0 moles.

It is desirable that in a cyclic process there should not be any build up of unwanted contaminants. Traces of chloride, which is a common contaminant of commercial grades of sodium dichromate, react with chromium trioxide in solution to give chlorine gas and trivalent chromium. In U.S. Pat. No. 2,034,256 Vetter proposes to remove the chlorine gas by blowing a current of air through the reaction mixture while cooling it to crystallise out sodium sulphate. He makes no attempt to reoxidise the trivalent chromium back to the hexavalent state and it will therefore accumulate until it eventually contaminates the chromium trioxide product or the sodium sulphate by-product or, most likely, both. In our process we have observed that it is difficult to reoxidise the trivalent chromium using chemical oxidising agents such as sodium persulphate because of the high acidity, and indeed under the prevailing conditions such oxidising agents tend to act as reducing agents. Accordingly it is desirable in the recycle processes of the invention to use a substantially chloride free grade of sodium dichromate.

The total yield of chromium trioxide in the cyclic process can easily be essentially the theoretical amount, being substantially equivalent to the entire amount of sodium dichromate introduced to the reaction mixture. The only losses may be those associated with the cooling crystallisation stage where chromium trioxide may be lost through inadequate washing of the sodium bisulphate crystals. An overall yield of chromium trioxide of over 99% is easily possible from the recycle process. When operated without recycle the yield may be about 90% when the initial sodium dichromate is acidified with 2.0 moles of sulphuric acid per mole of dichromate.

EXAMPLE 1

Sodium dichromate solution (1000 g) containing 90 weight percent of $Na_2Cr_2O_7.2H_2O$ is mixed with 1700 g of mother liquor from the crystallisation of sodium bisulphate in a previous cycle. The mother liquor contains 72% sodium bisulphate and 8% chromium trioxide and has a temperature of 60° C. The mixture is acidified with 604 g 98% sulphuric acid (equivalent to 2.0 moles per mole of sodium dichromate) whilst the temperature is maintained at 90° C. by cooling.

The slurry (containing 426 g, or 12.9% of its weight, of chromium trioxide crystals) is then evaporated under reduced pressure of 34 cm of mercury (absolute) until its boiling point has risen to 120° C. and 264 ml of distillate have been collected. The slurry now contains 605 g, or 19.9% of its weight, of chromium trioxide crystals and from which the crystals are separated by centrifuging whilst the slurry temperature is maintained above 110° C. The crystals are purified by washing with substantially saturated chromium trioxide solution at 110° C. while centrifuging. After drying they contain 99.8% $CrO_3$ and less than 0.15% sodium bisulphate. The centrifuging and washing are conducted using the preferred apparatus described in British Patent Specification No. 2 041 347.

The filtrate from the centrifuge is then cooled to 60° C. and the crystals of anhydrous sodium bisulphate separated by centrifuging and purified by washing with a small amount of warm water at 60° C. On a dry basis, the crystals weigh 725 g and contain no crystals of chromium trioxide.

The filtrate from the centrifuge is recycled for admixture with the next batch of sodium dichromate and sulphuric acid.

EXAMPLE 2

The process of Example 1 is repeated except that the amount of 98% sulphuric acid is 544 g (1.8 moles). The resultant slurry contains 369 g (11.3% by weight) chromium trioxide. The volume of distillate collected is 273 ml. The evaporated slurry contains 558 g (18.7% by weight) chromium trioxide. The separated crystals contain 99.8% $CrO_3$ and 0.12% sodium bisulphate.

The filtrate from the centrifuge is then cooled to 60° C. and the crystals of by-product separated by centrifuging. The dry crystals weigh 822 g and contain 74.8% $NaHSO_4$, 19.2% $NaHSO_4.Na_2SO_4$, 6.0% $CrO_3$. By washing with water at 60° C. much of the crystalline chromium trioxide can be removed.

EXAMPLE 3

The process of Example 1 is repeated except that the mixture is acidified with 664 g sulphuric acid (2.2 moles). The resultant slurry contains 433 g (12.6% by weight) chromium trioxide. The volume of distillate is 271 ml. The evaporated slurry contains 602 g (19.3% by weight) chromium trioxide crystals. The resultant dried crystals contain 99.9% $CrO_3$ and 0.1% sodium bisulphate.

The filtrate from the centrifuge is then cooled to 60° C. and the crystals of sodium bisulphate separated by centrifuging and purified by washing with a small amount of water at 60° C. On a dry basis, the crystals weigh 786 g and contain only anhydrous sodium bisulphate. The aqueous phase of the slurry at 60° C. contains 68.6% $NaHSO_4$, 3.4% $H_2SO_4$ and 8% $CrO_3$.

The mother liquor arising after separation of the sodium bisulphate weighs 1725 g and is recycled to the beginning of the next cycle for admixture with sodium dichromate liquor and sulphuric acid. However, to avoid the sulphuric acid concentration building up in the system the free sulphuric acid content of the recycled mother liquor must be compensated for by adding less new sulphuric acid to the next cycle. The mother liquor is, therefore, mixed with 1000 g of 90 weight percent sodium dichromate dihydrate liquor and acidified with 544 g 98% sulphuric acid (equivalent to 1.80 moles per mole of dichromate). Thereafter the process parameters are identical to those in Example 1. The ratio of acid to dichromate over the two cycles combines is thus 2.0 moles per mole.

EXAMPLE 4

Sodium dichromate solution (1000 g) containing 90 weight percent of $Na_2Cr_2O_7.2H_2O$ is acidified with 604 g 98% sulphuric acid (equivalent to 2.0 moles per mole of dichromate) whilst the temperature is maintained at 90° C. by cooling.

The slurry containing 450 g, or 28.1% of its weight of chromium trioxide, is then centrifuged to remove the $CrO_3$ crystals, whilst the temperature of the slurry is maintained above 65° C., and these are purified by washing with substantially saturated chromium trioxide solution at 65° C. while centrifuging as described in British Patent Specification No. 2041347.

The filtrate from the centrifuge is then evaporated under reduced pressure of 34 cm of mercury (absolute) until its boiling point has reached 120° C. and 148 ml distillate have been collected. The slurry now contains 100 g chromium trioxide crystals or 9.9% of its weight and from which the crystals are separated by centrifuging, whilst the temperature of the slurry is kept above 110° C. and purified by washing with substantially saturated chromium trioxide solution at 110° C. The total yield of chromium trioxide crystals is thus 550 g or 91% of the chromium values in the sodium dichromate feed liquor. The combined crops of chromium trioxide crystals are dried and then contain 99.8% $CrO_3$ and less than 0.2% $NaHSO_4$.

The filtrate from the centrifuge is cooled to 60° C. and the crystals of sodium bisulphate separated by centrifuging and purified by washing with a little water at 60° C. On a dry basis the crystals weigh 268 g and contain $NaHSO_4$ only.

EXAMPLE 5

The process of Example 4 is repeated except that the amount of sulphuric acid is 544 g (1.8 mole). The resultant slurry contains 384 g (24.9% by weight) chromium trioxide. The volume of distillate that is removed during the evaporation is 152 ml and the evaporated slurry then contains 118 g crystals (12.4% by weight). The total yield of chromium trioxide crystals is 502 g or 83% of the chromium values in the sodium dichromate feed liquor. The combined crops of chromium trioxide crystals are dried and they then contain 99.8% $CrO_3$ and less than 0.15% $NaHSO_4$.

The filtrate from the centrifuge is cooled to 60° C. and the crystals of sodium bisulphate separated by centrifuging. The dry crystals weigh 343 g and contain 47.5% $NaHSO_4$, 46.1% $NaHSO_4.Na_2SO_4$ and 6.4% $CrO_3$.

EXAMPLE 6

Sodium dichromate solution (1000 g), containing 90 weight percent of $Na_2Cr_2O_7.2H_2O$ is acidified with 2.0 moles of concentrate sulphuric acid i.e. 604 g 98% sulphuric acid (equivalent to 2.0 moles per mole sodium dichromate), whilst the temperature is maintained at 90° C. by cooling.

The precipitated crystals (containing the equivalent of 453 g of 100% $CrO_3$) are separated by centrifuging and purified by washing with warm substantially saturated aqueous solution of chromium trioxide.

The filtrate from the centrifuge is then evaporated at 120° C. under an absolute pressure 26 cm of mercury until 100 ml of condensate have been collected.

The new crop of chromium trioxide crystals (containing the equivalent of 91 g of 100% $CrO_3$) is then separated by centrifuging and purified by washing with hot substantially saturated aqueous chromium trioxide solution.

The filtrate from the centrifuge is then cooled to 60° C. and the resultant sodium sulphate crystals separated by centrifuging. The mother liquor is then recycled for reaction with sodium dichromate and sulphuric acid.

EXAMPLE 7

Sodium dichromate solution (2000 g) containing 40 weight percent of $Na_2Cr_2O_7.2H_2O$ is mixed with 1511 g of mother liquor from the crystallisation of sodium bisulphate in a previous cycle. The mother liquor contains 72% sodium bisulphate and 8% chromium trioxide and has a temperature of 60° C. The mixture is acidified with 537 g 98% sulphuric acid (equivalent to 2.0 moles per mole of sodium dichromate) whilst the temperature is maintained at 90° C. by cooling.

The mixture (which does not contain any chromium trioxide crystals) is then evaporated under reduced pressure of 34 cm of mercury (absolute) until its boiling point has risen to 120° C. and 1350 ml of distillate have been collected. The slurry now contains 536.9 g, or 19.9% of its weight of chromium trioxide crystals and from which the crystals are separated by centrifuging whilst the slurry temperature is maintained above 110° C. The crystals are purified by washing with substantially saturated chromium trioxide solution at 110° C. while centrifuging. After drying they contain 99.8% $CrO_3$ and less than 0.15% sodium bisulphate. The centrifuging and washing are conducted using the preferred apparatus described in British Patent Specification No. 2 041 347.

The filtrate from the centrifuge is then cooled to 60° C. and the crystals of anhydrous sodium bisulphate separated by centrifuging and purified by washing with a small amount of warm water at 60° C. On a dry basis the crystals weigh 644 g and contain no crystals of chromium trioxide.

The filtrate from the centrifuge is recycled for admixture with the next batch of sodium dichromate and sulphuric acid.

EXAMPLE 8

Sodium dichromate solution (2000 g) containing 40 weight percent of $Na_2Cr_2O_7.2H_2O$ is acidified with 537 g 98% sulphuric acid (equivalent to 2.0 moles per mole of dichromate) whilst the temperature is maintained at 90° C. by cooling. The mixture (which does not contain any chromium trioxide crystals) is then evaporated under reduced pressure of 34 cm of mercury (absolute) until its boiling point has risen to 107° C. and 1050 ml of distillate have been collected.

The slurry containing 326 g, or 22.0% of its weight of chromium trioxide crystals is then centrifuged to remove the crystals whilst the temperature of the slurry is maintained above 60° C. and these are purified by washing with substantially saturated chromium trioxide solution of 60° C. while centrifuging as described in British Patent Specification No. 2 041 347.

The filtrate from the centrifuge is then evaporated under reduced pressure of 34 cm of mercury (absolute) until its boiling point has reached 120° C. and 193 ml of distillate have been collected. The slurry now contains 162 g chromium trioxide crystals, or 16.8% of its weight and from which the crystals are separated by centrifuging whilst the temperature of the slurry is kept above 110° C. and purified by washing with substantially saturated chromium trioxide solution at 110° C. The total yield of chromium trioxide crystals is thus 488 g or 91% of the chromium values in the sodium dichromate feed liquor. The combined crop of chromium trioxide crystals are dried and then contain 99.8% $CrO_3$ and less than 0.15% $NaHSO_4$.

The filtrate from the centrifuge is cooled to 60° C. and the crystals of sodium bisulphate separated by centrifuging and purified by washing with a little water at 60° C. On a dry basis the crystals weigh 238 g and contain $NaHSO_4$ only.

We claim:

1. A process in which chromium trioxide is made by the essential sequential steps of reacting sodium dichromate with sulphuric acid in a molar ratio of sodium dichromate to sulphuric acid of from about 1:1.33 to about 1:2.8 in an aqueous reaction mixture to form a liquor containing dissolved chromium trioxide and dissolved sodium sulphate, evaporating the liquor to cause crystallisation of at least about 70% of the chromium present in the liquor as chromium trioxide crystals substantially free of sodium sulphate and to cause the concentration of sodium sulphate to be close to but below that at which crystals start to form, and separating the chromium trioxide crystals from the evaporated liquor.

2. A process according to claim 1, in which the sodium dichromate that is reacted with the acid is in the form of an aqueous solution of at least 66% sodium dichromate dihydrate.

3. A process according to claim 1 in which the molar ratio sodium dichromate:sulphuric acid is about 1:2 to 1:2.4.

4. A process according to claim 1, in which the ratio is about 1:2.05 to 2.3.

5. A process according to claim 1 in which the evaporation is conducted at about 100° to 140° C. under reduced pressure.

6. A process according to claim 1 in which the liquor formed by the reaction also contains chromium trioxide crystals.

7. A process according to claim 6 in which the sodium dichromate is introduced as a liquor of 80 to 92% by weight concentration and the sulphuric acid is introduced as concentrated sulphuric acid.

8. A process according to claim 1 in which the liquor formed by the reaction also contains chromium trioxide crystals and these crystals are separated from the liquor before the evaporation.

9. A process according to claim 1 in which the liquor formed by the reaction is substantially free of chromium trioxide crystals and the said evaporation is conducted in two stages and crystals formed in the first stage are separated from the liquor before the second stage.

10. A process according to claim 1 in which the separation of chromium trioxide crystals from liquor containing them is conducted by centrifuging while maintaining the temperature above a temperature at which any sodium sulphate crystallises.

11. A process according to claim 1 in which the separation of chromium trioxide crystals from liquor containing them is effected by centrifuging the crystals to a water content of from about 2 to 5% by weight and washing the centrifuged crystals with a wash liquor at a temperature above the temperature at which any sodium sulphate crystallises and recentrifuging until the water content is below about 3% by weight.

12. A process according to claim 11, wherein said wash liquor is selected from the group consisting of water and aqueous solutions of chromium trioxide.

13. A process according to claim 1, in which the evaporated liquor is cooled after separation of the chromium trioxide crystals and crystals of sodium sulphate are thereby formed, and these crystals are separated from the cooled liquor.

14. A process according to claim 13, in which the concentration of sodium sulphate is such that crystallisation of sodium sulphate starts at a temperature which is at least about 20° C. below the evaporation temperature and the evaporated liquor is cooled to a temperature of about 60° C.

15. A process according to claim 13 in which the liquors resulting from the separation of the sodium sulphate crystals are recycled to the reaction mixture and mixed with fresh sodium dichromate and sulphuric acid.

16. A cyclic process in which chromium trioxide is made by forming a reaction mixture of sodium dichromate and sulphuric acid in a molar ratio of about 1:1.33 to 2.8 to form a liquor containing dissolved chromium trioxide and dissolved sodium sulphate, evaporating the liquor under reduced pressure at a temperature of about 100° to 160° C. to cause crystallisation of chromium trioxide substantially free of sodium sulphate in an amount of at least 80% of the chromium in the reaction mixture and to cause the concentration of sodium sulphate to be close to but below that at which crystals of sodium sulphate start to form, separating the chromium trioxide crystals, cooling the resultant liquor to a temperature of at least about 55° C. but below about 90° C. to crystallise sodium sulphate mainly or wholly as anhydrous sodium bisulphate, separating the crystals, reforming the reaction mixture by combining some or all of the resultant liquor with sodium dichromate and sufficient sulphuric acid to provide the said ratio in the reaction mixture and repeating the process.

17. A process according to claim 16 in which the liquor formed by the reaction is a slurry of chromium trioxide crystals.

18. A process according to claim 16 in which the sodium dichromate is introduced as a liquor of about 80 to 92% by weight concentration, the sulphuric acid is introduced as concentrated sulphuric acid in an amount of substantially 2.0 moles per mole of sodium dichromate introduced to the reaction mixture, the evaporation is conducted at a temperature of about 100° to 140° C. the chromium trioxide crystallises in an amount substantially equivalent to the amount of sodium dichromate introduced to the reaction mixture and the chromium trioxide is separated by centrifuging.

19. A process according to claim 16, in which the evaporation is conducted at a temperature of about 100° to 122° C. at an absolute pressure of about 26 to 50 cm mercury and is terminated before the boiling point of the liquor exceeds about 122° C. and at a time when the concentration of sodium sulphate in the liquid is such that crystallisation of sodium bisulphate starts when the temperature has dropped to about 90° C.

20. A process according to claim 16, in which the chromium trioxide crystals are separated from the evaporated liquor by centrifuging until the water content of the crystals is from about 2 to 5% and washing the crystals with wash liquor and centrifuging until the crystals have a water content of below about 3% by weight, the centrifuging and wash liquor being at a temperature that is above about 95° C. and is above that at which sodium sulphate crystals will form.

21. A process according to claim 16, in which the chromium trioxide crystals are separated from the evaporated liquor by centrifuging until the water content of the crystals is from about 2 to 5% and washing the crystals with wash liquor and centrifuging until the crystals have a water content of below about 3% by weight, the centrifuging and wash liquor being at a temperature that is above about 95° C. and is above that at which sodium sulphate crystals will form and the wash liquor is selected from water and aqueous solutions of chromium trioxide.

22. A process according to claim 16, in which the chromium trioxide crystals formed in the reaction mixture are separated from the liquor before the liquor is evaporated, the separation being conducted by centrifuging until the crystals have a water content of from about 2 to 5%, washing the crystals with wash liquor and centrifuging the crystals until they have a water content of below about 3% by weight, the centrifuging and wash liquor being at a temperature of at least about 50° C. and above that at which sodium sulphate will crystallise.

23. A process according to claim 20 in which the liquor separated during washing is recycled to the liquor being evaporated.

24. A process according to claim 16 in which the molar ratio sodium dichromate:sulphuric acid in the reaction mixture is about 1:2.05 to 2.4.

* * * * *